United States Patent [19]
Yoshikawa

[11] 4,042,936
[45] Aug. 16, 1977

[54] ELECTROSENSITIVE RECORDING METHOD

[75] Inventor: Akira Yoshikawa, Ebina, Japan

[73] Assignee: Fuji Xerox Co., Ltd., Tokyo, Japan

[21] Appl. No.: 600,160

[22] Filed: July 29, 1975

[51] Int. Cl.$^2$ ............................................. G01D 15/06
[52] U.S. Cl. ...................................... 346/1; 346/135; 346/165
[58] Field of Search ................... 346/135, 1, 165, 164; 204/2

[56] References Cited
U.S. PATENT DOCUMENTS

| | | | |
|---|---|---|---|
| 2,664,044 | 12/1953 | Dalton | 346/135 X |
| 3,789,425 | 1/1974 | Matsushima | 346/135 |
| 3,891,513 | 6/1975 | Yasumori et al. | 346/135 X |

Primary Examiner—Joseph W. Hartary
Attorney, Agent, or Firm—Gerald J. Ferguson, Jr.; Joseph J. Baker

[57] ABSTRACT

A recording method comprising the steps of selectively applying electric current or discharge to the member comprising a substrate; an electrically conductive, light colored intermediate layer disposed on the substrate, the color of the intermediate layer being convertible to a darker color in response to the application of the electrical current or discharge, and a white surface layer disposed directly on the intermediate layer, the white surface layer being no greater than approximately 10 microns thick.

2 Claims, 3 Drawing Figures

ELECTROSENSITIVE RECORDING METHOD

BACKGROUND OF THE INVENTION

1. Field of the Invention

This invention relates to an electrosensitive medium which can form a visible image directly from an electric signal.

2. Discussion of the Prior Art

A variety of recording media are known which form a visible image directly from an electric signal but they have various drawbacks.

For example, in one known recording method, recording is effected by subjecting a conductive solution or an electrolyte impregnated in a paper sheet to electrolysis in response to an electric signal. In this method various difficulties have been experienced including (a) great variations in recording characteristics due to the water content of the paper sheet, (b) wear of the electrodes, (c) fading of picture images, and (d) discoloration of the recording paper sheet and the like.

In order to eliminate these difficulties, a variety of dry type electrolytic recording media, as disclosed in Japanese Patent Publication No. 38-22341, have been developed. However, none of this prior art recording media is satisfactory in that they invariably contain a large amount of a metal oxide or a metal sulfide in the coloring layer of the recording sheet so that wear of the recording stylus is accelerated due to the substantial hardness of the coloring layer. Further, a metal oxide or a metal sulfide which permits easy color development will have its own color and therefore is not suitable for coating on a recording sheet since the latter has imparted thereto the particular color of the metal oxide or sulfide used. Also, a recording sheet using a white metal oxide has drawbacks in that it is susceptible to non-uniform recording and lowered image density because of its increased electrical resistance.

There has also been used in another embodiment of the prior art an electrosensitive medium comprising (a) an underlayer of carbon or some other dark colored conductive material coated with a binder on (b) a substrate or a supporting means, (c) a white surface layer being disposed on the dark colored layer. With such a recording medium, portions of the white surface layer are burnt and removed by sparking to form a picture image by means of the contrast between the non-sparked white surface layer and the dark colored underlayer. However the burning operation produces a bad odor, smoke and ashes to the potentially extreme discomfort of the operator. Moreover, the white surface layer must have a thickness as large as 10 to 20 microns in order to conceal the color of dark colored underlayer with the result that the recording medium suffers from lowered recording sensitivity in addition to the difficulties mentioned above. Hence, application of high voltage is necessitated which tends to disintegrate the dark colored underlayer into powder thereby causing recording failure because of deposition of the powder on the recording stylus. Further, the powder deposited on the recording stylus is transferred again onto the white surface layer in the form of a so-called "tail". Also, a portion of the powder is directly dropped onto the white surface layer without depositing on the recording stylus and spoils marginal portions of the picture image.

An example of prior art which overcomes these difficulties is found in Japanese Patent Publication No. 44-31998 where there is disclosed a recording member comprising a base layer such as a paper sheet, a colored layer disposed on the base, a thin metallic layer disposed on the colored layer and a white surface layer which can be very thin. However, the recording medium disclosed in this patent publication is disadvantageous in that it causes accelerated abrasive wear to the recording stylus. Thus, it cannot be practically used for stylus-scanning type recording due to tone variations. Therefore, the recording medium of the above Japanese patent publication has been exclusively used for the dot matrix type recording.

SUMMARY OF THE INVENTION

It is an object of the present invention to provide a recording medium which will overcome the difficulties mentioned above and which is capable of forming a clear and stable record in response to an electric signal.

A more particular object of the present invention is to provide a recording medium of the above type which suppresses to a minimum the production of bad odors, smoke and burnt ashes during a recording operation.

Another object of the present invention is to provide a recording medium of the above type which has a high degree of whiteness and has an agreeable appearance on the eyes.

A further object of the present invention is to provide a recording medium of the above type which eliminates spoiling of marginal portions of a picture image due to the deposition of carbon powder thereon.

A still further object of the present invention is to provide a recording medium of the above type which is capable of forming picture images of substantially uniform quality and tones in a stylus-scanning type recording.

Other objects and advantages of this invention will be apparent from a reading of the following specification and claims taken with the drawing.

DETAILED DESCRIPTION OF THE PREFERRED EMBODIMENTS

Figure 1:
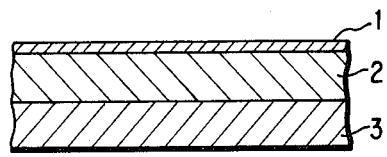
FIG. 1 is a diagrammatic sectional view of an illustrative, basic embodiment of a recording medium according to the invention.

FIG. 1 is a diagrammatic view of a basic embodiment of a recording member according to the invention, the recording member comprising (a) a white surface layer 1 formed from a white pigment of zinc oxide, titanium oxide or the like and a binder, (b) a conductive, intermediate layer 2 formed from a conductive zinc oxide, vanadium pentoxide or the like which produces a color in response to an electric signal and a binder, and (c) a support body or substrate 3 comprising a paper sheet, plastic film or the like.

Details of the respective layers are as follows. The white surface layer 1 has close relation with the whiteness of the recording member per se and serves to raise the contrast of the image portions as well as to enhance the quality of the picture images. As for the white surface layer 1, materials may be used which have been used in conventional electrosensitive paper, for example, a pigment such as zinc oxide, titanium oxide, tin oxide, aluminum oxide, zinc, copper, copper rhodanide, lead rhodanide, thiosulfate, basic lead carbonate, manganese carbonate, lead stearate, lead phthalate, manganese phthalate or the like, a metal and a metal oxide or a mixture thereof, in the form of a mixture with a binder such as of a polyester resin, epoxy resin, melamine resin, phenol resin, urea resin, Glyptal resin, sulfonamide copolycondensation resin based on a alkyd resin, alcohol soluble phenolformaldehyde resin, polystyrene derivative, polyether, polystyrene, polymethacrylate, polyvinyl alcohol, vinyl acetate, shellac, casein or the like. The mixture is applied on a substrate in a thickness less than 10 microns and preferably less than 5 microns.

The conductive, intermediate layer 2 functions as a current path and at the same time serves to provide or produce a color for the formation of the picture image. The conductive layer 2 may comprise any of the conventional electrolytic recording materials including metal oxides such as zinc oxide, titanium dioxide, lead oxide, nickel oxide, cadmium oxide, silver oxide, mercury oxide, lead carbonate and the like, metal sulfide such as zinc sulfide, cadmium sulfide and the like, or color developing agents such as a metallic acid and its alkali metal salt or alkaline earth metal salt or ammonium salt, in the form of a mixture with a binder such as polyacrylamide, polyvinylbenzyltrimethyl-ammonium chloride, styrene-maleic anhydride copolymer, polyvinyl alcohol, polyacrylic acid, cellulose derivative, acrylic resin, nylon resin, styrene resin or the like. In order to increase the conductivity, the mixture may have added thereto a powder of a metal such as aluminum, zinc or copper or of a metal compound such as a metal sulfide.

The support or substrate 3 serves to retain the afore-mentioned white surface layer 1 and the intermediate conductive layer 2 and may be formed from a sheet of paper, plastic film, metal foil or the like which is capable of retaining the afore-mentioned two layers 1 and 2 thereon.

Figure 2:
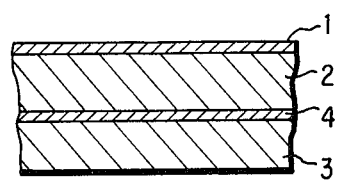
FIG. 2 is a diagrammatic sectional view of an illustrative, modified embodiment according to the invention.

Referring now to FIG. 2, which shows a modified embodiment according to the present invention, white surface layer 1 and support 3 have the same construction as in FIG. 1. However, the colorable conductive layer 2' responsive to an electric signal has a higher electrical resistance value than the conductive, intermediate layer 2 and includes a conductive layer 4 formed by vapor deposition of aluminum or from powder of a metal which will impart conductivity thereto.

Figure 3:
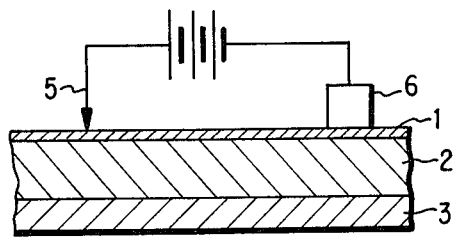
FIG. 3 is a diagrammatic view of an illustrative application of the recording medium according to the invention.

The electrosensitive members of FIGS. 1 or 2 may be employed in a conventional recording process such as shown in FIG. 3, using a stylus 5 of tungsten, iridium, silver, copper, stainless steel or the like on the surface of the recording medium and a counter or return electrode 6 with a large surface area, so that, upon application of a DC or AC voltage across the stylus 5 and the counter electrode 6, the white surface layer portion immediately beneath the stylus 5 is destroyed and at the same time the conductive, intermediate layer 2 is exposed or uncovered to provide or produce a color. Further, conductive layer 2 acts as a current path between stylus 5 and counter electrode 6.

In accordance with one aspect of the invention, conductive, intermediate layer 2 is of a light color such as light grey, light yellow, light pink or the like. The density of intermediate layer 2 is no greater than approximately 0.5 and preferably about 0.2. The color of intermediate layer 2 is lighter than that employed in the conductive underlayers of known electrosensitive mediums. Thus, the white surface layer does not have to be very thick to conceal the conductive underlayer and may thus be extremely thin.

Further, bad odors, smoke and burnt ashes are produced in only an extremely small or imperceptible amount and the electric power for burning the white surface layer 1 is reduced a considerable degree thus substantially lessening the possibility of spoiling the marginal portions of the picture image because of destruction of the conductive, intermediate layer 2.

Furthermore, since the electrosensitive member of the present invention has increased whiteness as compared with conventional dry type electrolytic recording media, it becomes possible to employ a coloring agent which has a substantial density variation but which has been difficult to use in conventional dry type recording media due to their inferior whiteness. In addition, it now is possible to hold the abrasive wear of stylus 5 to a lesser amount as compared with known dry type electrolytic recording media and to a degree as in the conventional electrosensitive media.

The present invention will be illustrated more particularly by way of Examples.

EXAMPLE 1

An acetylbutylcellulose solution containing 10% zinc oxide was coated on a commercially available electrolytic colored, recording paper sheet (KTF Paper, a product of Tokushu Seichi) in a thickness of 5 microns by means of a bar coated and brushing to form a white surface layer 1 thereon.

The recording paper sheet originally had a yellowish grey color and a density of 0.18 but the apparent whiteness thereof was increased by the white surface layer 1 which had a density of 0.08 where density is defined as in "ASA PH2. 17—1958".

The coated, recording paper sheet was mounted on a Toshafax and subjected to a recording procedure with a line density of 10 l./mm to obtain a picture image having a density of 0.8. Burning odors were produced only in a slight amount as compared with the known electrosensitive paper during a recording operation, with almost no smoke or burnt ashes. There was obtained a satisfactory record which had improved whiteness and no spoilage of the marginal portions of the picture image.

EXAMPLE 2

30 parts by weight of molybdic acid, 100 parts by weight of finely powdered copper were added to an aqueous solution of 12 parts by weight polyvinylbenzyl-trimethyl-ammonium chloride and agitated for two days in a ball mill. The resultant mixture was coated on a quality paper sheet in a thickness of about 30 microns to obtain a colored conductive layer 2. An acetylbutylcellulose solution containing 10% titanium dioxide and 2% silver powder was coated on the colored conductive layer 2 by means of a bar coater in a thickness of about 4 microns and by means of brushing to obtain a white surface layer 1. The colored conductive layer 2 had a reddish yellow color but after being covered with white surface layer 1, it had a satisfactory whiteness.

The resultant recording paper was mounted on a Toshafax for recording with a line density of 20 l./mm to obtain a record of 1.0 in density. Burning odors, smoke and ashes were produced only in an ignorable amount during the recording operation as compared with the known electrosensitive paper. The resultant picture image had no spoilage of the margin and was clear and satisfactory in contrast.

The present invention has been herein described by way of particular examples however, it should be understood that not only the electrolytic coloring materials but also coloring materials which produce a color in response to an electric current or voltage may be used in coloring conductive layer 2 of the recording medium of the invention.

What is claimed is:

1. A recording method comprising the steps of selectively applying electric current or discharge to
   an electrosensitive member comprising
   a substrate;
   an electrically conductive, light colored intermediate layer disposed on said substrate, the color of said intermediate layer being convertible to a darker color in response to the application of said electrical current or discharge thereto; and
   a white surface layer disposed directly on said intermediate layer, said white surface layer being no greater than approximately 10 microns thick;
   said electric current or discharge destroying said white surface layer to selectively expose said intermediate layer in accordance with an image to be recorded, said image resulting from the color contrast between the exposed and nonexposed portions of the intermediate layer,
   said electric current being selectively applied to said recording member by a stylus having a small contact area with said white layer, said electric current passing through said intermediate layer to a counter electrode in contact with said white layer, the contact area of said counter electrode with said white layer being substantially greater than the said contact area of said stylus with said white layer so that the white layer is not destroyed as current passes back to said counter electrode from said intermediate layer through said white layer.

2. A recording method as in claim 1 where said intermediate layer comprises two further layers, the first of said further layers being electrical conductive and disposed on said substrate and the second of said further layers being light colored, the color thereof being convertible to a darker color in response to the application of an electrical current or discharge thereto, said second layer being disposed on said first layer.

* * * * *